Figure 1:
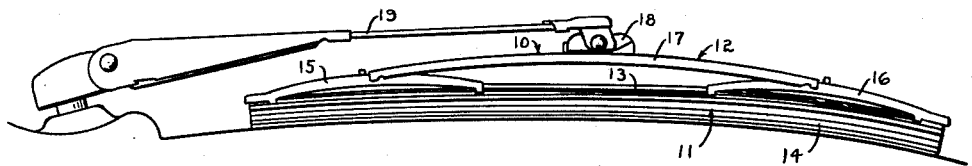

Feb. 12, 1963   J. W. ANDERSON   3,076,993
WINDSHIELD WIPER BLADE
Filed Oct. 24, 1958   2 Sheets-Sheet 1

INVENTOR.
JOHN W. ANDERSON
BY W. E. Recktenwald
A. D. McFadyen
C. S. Penbold
ATTORNEYS Feb. 12, 1963   J. W. ANDERSON   3,076,993
WINDSHIELD WIPER BLADE
Filed Oct. 24, 1958   2 Sheets-Sheet 2

INVENTOR.
JOHN W. ANDERSON
BY W. E. Recktenwald
A. D. McFadyen
C. S. Penfold
ATTORNEYS 3,076,993
WINDSHIELD WIPER BLADE
John W. Anderson, 578 Broadway, Gary, Ind.
Filed Oct. 24, 1958, Ser. No. 769,404
13 Claims. (Cl. 15—250.42)

This invention relates to a windshield wiper assembly and more particularly to an improved wiper assembly for wiping flat, curved, and/or wrap-around windshields and to an improved method of making same.

An object of the invention is to provide simple means by which the relative flexibility of various longitudinal portions of a flexible backing strip for a wiper for curved windshields may be varied to conform to varying curvatures of the windshield.

A further object of the invention is to provide a method by which a portion of the flexor, or backing strip, of a wiper blade for curved windshields, may be increased in effective length and in flexibility without substantially increasing the over-all length of material required to produce the flexor, or backing strip, thus to attain greater flexibility in said portion for more ready and more extended response to wiper arm pressures transmitted thereto.

A further object of the invention is to provide a method of manufacture whereby the flexibility of a predetermined portion of a flexor, or backing strip, may be changed by forming such portion so as to increase its effective length while at the same time changing the thickness of the material in said portion, whereby to alter the resistance of the flexor, or backing strip, to flexing under pressure transmitted thereto from the wiper arm.

Another object of the invention is to provide a flexor, or backing strip, in which the flexibility of different portions thereof is reduced or increased respectively to provide a combination of longitudinal and transverse deformations of the material from which said strip is made.

A further object of the invention is to provide means by which variations in the degree of conformability of different longitudinal portions of a wiper blade, in maintaining contact of said blade, throughout its length, with a windshield surface of varying degrees of curvature, may be accomplished without the employment of auxiliary springs or of members influenced thereby.

A further object of the invention is to facilitate conformity of a wiper blade to varying degrees of curvature of a surface to be wiped without substantially varying the width of the flexor, or backing strip, throughout its length.

A further object of the invention is to provide a flexor, or backing strip, for wiper blades for nonflat windshields in which both linear and transverse deviations in the shape of the material used may be effected economically in a single forming operation.

A further object of the invention is to provide an improved wiper blade, a portion of which, adjacent an extremity thereof, conforms readily to comparatively abrupt curvatures in the outwardly extending portions of the surface to be wiped.

A still further object of this invention is to provide a wiper assembly that is sufficiently flexible to conform to the surface being wiped and is sufficiently inflexible in portions thereof to prevent such portions from lifting from the windshield, particularly under the influence of wind currents and the like.

And yet another object of this invention is to provide an improved wiper assembly of simple construction and operation, which is not only more economical to manufacture, but also is efficient in use.

Other objects and advantages of the invention will become evident after considering the description hereinafter set forth in conjunction with the drawings annexed hereto.

Figure 2:
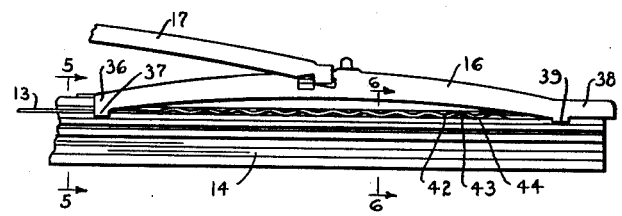
Figure 3:
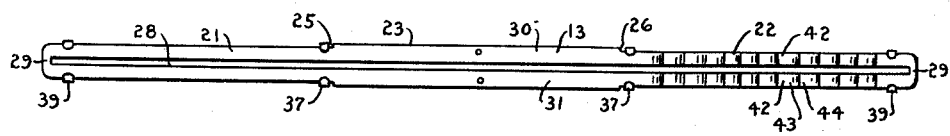
Figure 4:
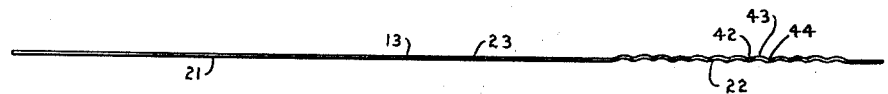
Figure 5:
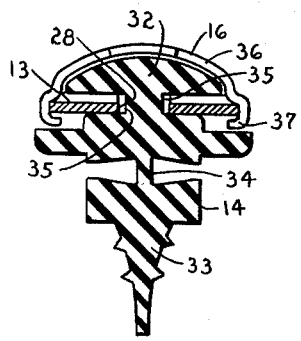
Figure 6:
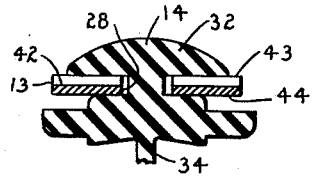
Figure 7:
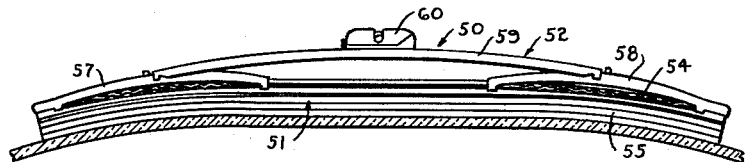
Figure 8:
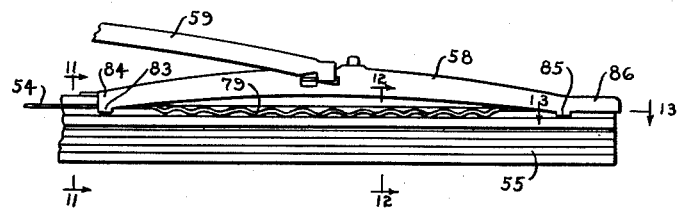
Figure 9:
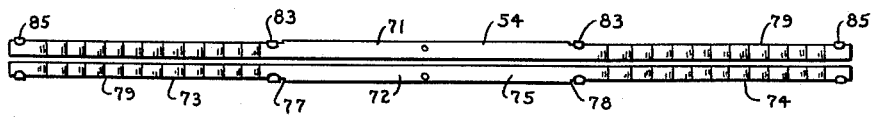
Figure 10:
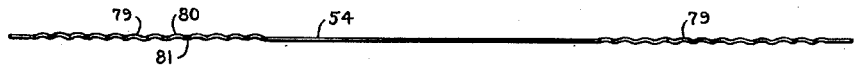
Figure 11:
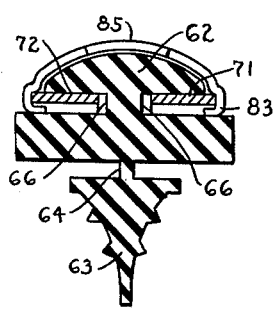
Figure 12:
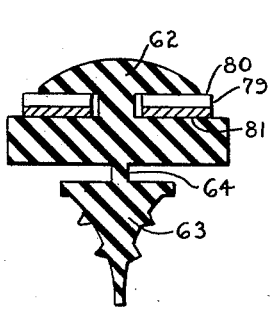
Figure 13:
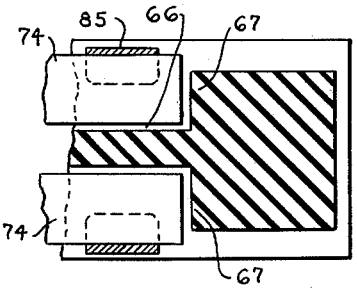

In the drawings:
FIGURE 1 is a side view in elevation of a preferred form of my improved windshield wiper blade assembly as applied to a windshield;
FIGURE 2 is an enlarged view of the right-hand portion of the full assembly of FIGURE 1 removed from the windshield;
FIGURE 3 is a bottom view of the backing strip or flexor of FIGURE 1 together with the underengaging sliding claws at the ends of the pressure-transmitting means;
FIGURE 4 is a side view of the flexor of FIGURE 3;
FIGURE 5 is a cross-sectional view taken along the line 5—5 of FIGURE 2;
FIGURE 6 is a partial cross-sectional view taken along the line 6—6 of FIGURE 2;
FIGURE 7 is a side view of a modified form of my improved windshield wiper blade assembly;
FIGURE 8 is an enlarged view of the right-hand portion of the full assembly of FIGURE 7;
FIGURE 9 is a bottom view of the backing strip or flexor of FIGURE 7 together with the underengaging sliding claws at the ends of the pressure-transmitting means;
FIGURE 10 is a side view of the flexor of FIGURE 9;
FIGURE 11 is a cross-sectional view taken along the line 11—11 of FIGURE 8;
FIGURE 12 is a cross-sectional view taken along the line 12—12 of FIGURE 8; and
FIGURE 13 is a cross-sectional view taken along the line 13—13 of FIGURE 8.

Referring more particularly to FIGURES 1-6 of the drawings, the windshield wiper assembly is generally designated 10 and is comprised of a wiper blade 11 and a pressure-distributing device 12. The wiper blade 11 is comprised of an elongate resiliently flexible support, backing, or flexor 13 and a resilient rubberlike wiping element 14 carried by the support. The pressure-distributing or transmitting device 12 may be constructed in various ways, but as herein illustrated preferably includes a pair of corresponding secondary yokes 15 and 16 having their ends slidably connected to the blade 11, a primary yoke 17 having its ends connected to intermediate portions of the secondary yokes, and a connector 18 carried by the primary yoke for connection with the end portion of a windshield wiper arm 19.

The flexor 13, as will be described in detail hereinafter, is elongate and has corresponding end portions 21 and 22 and an intermediate portion 23 of a greater width than the end portions. This variation in width forms shoulders which provide longitudinally spaced abutment means 25 and 26. The support or flexor 13 is preferably provided with an elongate narrow slot 28 terminating short of the ends of the support to provide connecting or hinge portions 29 whereby longitudinal parallel side portions 30, 31 of the support can be spread apart to enlarge the size of the slot so that the resilient element 14 can properly be located therein, after which the longitudinal portions 30, 31 are released to cause such portions to interlock with the element 14. Due to the character of the support or flexor, the blade is primarily limited to flexation or movement in a direction substantially perpendicular to a surface of the windshield to be cleaned.

The wiping element 14 is provided with an attaching or back portion 32 and a wiping portion 33 which is joined to the attaching portion by an intermediate restricted portion or web 34 so as to permit tilting of the wiping portion. The attaching portion is provided with a pair of corresponding grooves 35, one being located adjacent each side of the attaching portion in a predetermined position so that they lie substantially in the same plane. The grooves 35 receive the intermarginal edge portions of the longitudinally extending portions 30, 31 of the support for holding the support or flexor 13 and element 14 assembled.

The secondary yokes 15 and 16 are preferably identical in design and construction. The inner end of the base wall of each secondary yoke is formed to provide a transverse arcuate or curved end 36 and a pair of corresponding ears or claws 37. The outer end of each secondary yoke is provided with a shroudlike end wall 38 which serves to conceal the ends of the support. The outer end of each of the secondary yokes 15, 16 is also provided with a pair of ears or claws 39 spaced inwardly from the end wall 38. When assembled with the blade, the pairs of ears or claws 37 and 39 of the yoke 15 extend over the reduced extremity 21 of the support or flexor 13 and the corresponding ears or claws 37 and 39 of the yoke 16 similarly extend over the extremity 22 of the support or flexor to effect a sliding feature between the yokes and the support. The secondary yokes 15 and 16 are preferably assembled with the support by merely sliding the yokes inwardly along the extremities of the support until the inner ends of the yokes engage the abutment means, after which the primary yoke 17 is attached to the secondary yokes in a manner shown and described in my copending application Serial No. 609,631, filed September 13, 1956, now Patent No. 2,955,313.

It is to be understood that the invention is not intended to be limited to the above-described pressure-transmitting system or to the particular shouldered flexor, these elements being shown and described for illustration purposes only.

The flexible support or flexor 13 is provided with a means whereby different degrees of flexibility are introduced into the flexor during manufacture of the flexor to satisfy the particular wiping requirements of the blade assembly with which the flexor is to be used. That is, on a windshield with an extreme curvature, particularly on the outboard side portion thereof, it is necessary for the wiper blade 11 comprising the wiping element 14 and the flexor 13, lying substantially beneath the outwardmost secondary yoke 16, to flex or bend in the plane lying substantially perpendicular to the surface of the windshield to a much greater extent than for older type curved windshields. By providing the flexor 13 with a more freely flexible portion in the area where greater and more severe flexing is required and by maintaining the balance of the flexor or support with a lesser degree of flexibility, a wiper blade is produced that conforms throughout its length to more sharply curved surfaces of a windshield, such as are encountered in wrap-around type windshields.

In one preferred form, such as shown in FIGURES 1-6, inclusive, the one-piece flexor 13 is shown with the claws 37, 39 of each secondary yoke 15, 16 embracing the edge portions of the reduced end portions 21, 22, respectively, of the flexor. The end portion 22 of the flexor 13 has corrugations 42 formed therein in a direction lying substantially perpendicular to the longitudinal axis of the flexor 13 throughout substantially the length of said reduced end portion 22. The corrugations 42, in the preferred showing, are preferably of a wave formation having substantially straight, parallel, regular, and equally curved ridges 43 and valleys 44, as best shown in FIGURES 2 and 4. The corrugations 42 can be produced during the forming of the flexor and have the effect of reducing the resistance of the end portion 22 to flexing, which has a greater range of adaptability to purposes defined herein than does reducing either the width or the thickness of the material of which the flexor is made.

As referred to above, flexor 13 may be made from a piece of material of substantially uniform standard thickness normal for a particular wiper assembly. The transverse corrugations 42 herein proposed are added simultaneously to each side portion 30, 31 throughout substantially the length of the end portion 22 of the flexor so as to preferably terminate just short of the inner claws 37 and outer claws 39 of the secondary yoke 16 when assembled with the pressure-transmitting device 12. The resulting flexor 13 has the usual degree of flexibility throughout the uncorrugated portion of the flexor and has a substantially increased degree of flexibility throughout the corrugated end portion 22 of the flexor.

The incorporation of the corrugations 42 into the flexor has the effect of increasing the effective length of the flexor without substantially increasing or decreasing the actual length thereof. In one preferred method of forming the corrugations into the flexor, two matching corrugated dies, equal in length to the desired length of the corrugated portion of the flexor, are simultaneously forced together against the interposed end portion of the flexor. Increments of the end portion of the flexor are simultaneously stretched and bent between the dies to thereby form successive ridges and valleys resulting in the corrugated shape. The stretching of the metal of the end portion adds effective length to the flexor, but due to the bending into the corrugated shape the actual length of the flexor remains substantially the same. Simultaneously, the stretching of the metal of the corrugated portion also reduces the thickness of the metal in the corrugated portion by comparison to the uncorrugated portion or portions of the flexor. The result of both the increase in the effective length and the reduction in the thickness of the said end portion of the flexor is to substantially increase the flexibility of said corrugated end portion of the flexor.

The corrugated end portion 22, beneath the secondary yoke 16, is therefore more flexible in a direction substantially perpendicular to the plane of the flexor and, when assembled with the rubber element of a blade, results in a blade having different degrees of flexibility at predetermined portions along its length to meet the demands to be placed upon the wiper assembly with which the flexor is to be used.

Since the corrugations 42 may be formed simultaneously by the same stroke of the press that cuts or forms other parts of the flexor, as the material is fed progressively into the press, the corrugating operation adds no cost to the production of the flexor. Thus, the flexor embodied in the present invention produces a substantially improved result when incorporated in a wiper assembly without in any way increasing the cost of producing the flexor. Likewise, an improved refill assembly of the type described and claimed in U.S. Patent No. 2,782,445 results from the incorporation in said refill of the inventive concept above described.

Maximum curvatures of the windshield encountered by the wiper assembly 11 are those traversed by the outer end portion of the blade, where reduced resistance to flexure, occurring under the outer secondary yoke, assists the blade to conform to the surface of the windshield being wiped. The surface area of the glass traversed by the mid-portion of the blade, i.e., that portion lying between the respective inner claws 37, 37 of the secondary yokes 15, 16, is usually less abruptly curved and, therefore, less flexibility in the flexor is required. The mid-portion of the blade wipes the somewhat more critical area of the windshield directly in the line of vision of the driver and is the portion ordinarily more susceptible to lifting off the glass through pressure of air currents encountered against the windshield in driving. It has been found that by maintaining, in that portion or segment of the flexor lying between the secondary yokes, the prevailing standards of resistance to flexure, with relation to the length, design, and dimensions of the blade assembly, that segment has satisfactory resistance to normal windlift and otherwise, under normal driving conditions, remains in effective operative contact with the windshield. It perhaps should be pointed out that the predetermined pressures, at the four contacts of the pressure-distributing assembly with the flexor, remain substantially constant, so that while a more flexible segment of the flexor responds effectively to sharp curvatures, the pressures at each end of each relatively more flexible portion are normal, predetermined pressures that substantially insure satisfactory conformity of the wiping edge of the rubber element to the windshield throughout the entire length of that element and throughout the entire stroke of the blade.

It will be understood that when the flexor (as has been practiced heretofore) is of the same thickness throughout its length the need for greater flexibility to cause the blade to conform to the sharper outer curvatures of a wrap-around windshield might force a decision to adopt a uniform thickness of the flexor, generally too thin to hold the middle portion of the rubber firmly enough to the glass to prevent windlift and chatter of the blade at higher car speeds. Thus, it may be seen that no uniformly desirable compromise in flexor thickness as between these extremes has been readily attainable in the art. The present invention, however, permits any desired differential in flexibility of any predetermined longitudinal portions of the flexor, to promote conformity and prevent "mid lift" of the blade, without adding to the cost of producing the blade.

Most windshields currently in use and projected for future use have surface portions in the vicinity of the wiper shaft which are substantially flat or are only moderately curved so that one end portion of the blade assembly need not be any more flexible than the central portion of the blade. The one preferred form shown in FIGURES 1 to 6 is of the type just described, namely, one end portion 21 is inherently more flexible than the mid-portion 23 of the flexor and blade. The other end portion 22 of the flexor is corrugated at 42 to increase the flexibility thereof so that the blade in the vicinity of the corrugations more readily conforms to the sharp wrap-around curvatures of the windshield.

In the windshield wiper replacement market, there are a large number of wiper blades sold that may be installed on a wiper arm as readily with one end of the blade outward as with the other end outward. It is, therefore, desirable to provide, under each secondary yoke, the same flexibility since it is impractical to rely upon servicemen or car owners to select one or the other end of the blade to install in the outboard position. Accordingly, it is to be understood to be within the scope of this invention to have corrugations 42 at either end portion, at both end portions, or at any larger or smaller increment of the length of the blade to arrive at any desired result with respect to varying degrees of flexibility throughout the length of the blade.

In my copending application Serial No. 710,598, filed January 23, 1958, now abandoned, I have disclosed a way to increase the resistance of portions of a flexor to flexing in a particular plane by adding longitudinally disposed channels or ribs in the sides of the flexors. The channels serve as stiffening members so as to decrease the flexibility of the portions receiving the channels. It is to be understood to be included within the scope of this invention to incorporate transverse corrugations in a portion or portions of a flexor to increase the flexibility of that portion or portions of the flexor and also to incorporate longitudinal channels in another portion or portions of the flexor to reduce the flexibility of that portion or portions of the flexor.

FIGURES 7-13 illustrate a modified form of my invention wherein a wiper assembly 50 comprises a wiper blade 51 and a pressure-transmitting device 52. The wiper blade 51 is comprised of an elongate flexible support or flexor 54 and a resilient rubberlike wiping element 55 carried by the support. The illustrated pressure-transmitting device 52 is comprised of a pair of secondary yokes 57, 58 and a primary yoke 59 connected to the intermediate portions of the yokes 57, 58. A connector 60 is carried by the primary yoke for attaching the wiper assembly to a windshield wiper arm.

The wiping element 55 is provided with an attaching portion 62 and a wiping portion 63 which is joined to the attaching portion by a web 64 so as to permit tilting of the wiping portion relative to the attaching portion. The attaching portion 62 is provided with a pair of corresponding grooves 66, one being located in each side of the attaching portion in a predetermined position so that they lie substantially in the same plane. Near each end of each groove 66 in the attaching portion 62 of the element 55 is an abutment 67 extending transverse to the base of the groove whereby the ends of the grooves are closed. Grooves 66, with the ends closed as at 67, are sometimes referred to as blind grooves or pockets.

FIGURES 9 and 10 illustrate the modified form of flexor 54 adopting the teaching of my invention to a two-piece type flexor. The flexor 54 has two unattached independent sides 71, 72 each with corresponding end portions 73, 74 and an intermediate portion 75 delineated from the end portions by abutment surfaces 77, 78 formed in one edge of each side 71, 72. The end portions have corrugations 79, which are similar to the corrugations of FIGURES 1-6, and are comprised of substantially straight, parallel, regular, and equally curved ridges 80 and valleys 81.

The respective sides 71, 72 of the flexor are partially nested in the grooves 66 with the edges containing the abutments 77, 78 projecting outwardly from the wiping element 55. Each secondary yoke 57 and 58 has a pair of claws 83 formed on the inner end portion 84 thereof and a pair of claws 85 formed on the outer shrouded end portion 86 thereof. The claws 83 and 85 on secondary yoke 57 engage around the edges of the reduced end portions 73 of the sides of the flexor 54, and the claws 83 and 85 on the other secondary yoke 58 engage around the other reduced end portions 74 of the sides of the flexor 54 for holding the sides 71, 72 of the flexor 54 seated in the blind grooves 66. The abutments 67 at the ends of the grooves 66 prevent the sides 71, 72 of the flexor 54 from sliding out of the ends of the rubber element. The primary yoke 59 is attached to the yokes 57, 58 for holding the pressure-transmitting device 52 assembled on the flexor 54 of the wiper blade 51.

In the modified form of my invention, the corrugated portion 79 terminates just short of the inner and outer claws 83, 85, respectively, of the secondary yokes 57, 58. The yokes 57, 58 are free to slide, within operative limits, on said flexor. The ridges 80 of the corrugations 79 are adapted to engage the one wall of the grooves 66 and the valleys 81 of the corrugations are adapted to engage the other wall of the grooves 66 during normal conditions of use of the wiper blade and wiper assembly.

The modification of FIGURES 7-13 performs all of the novel functions attributed to the preferred form shown in FIGURES 1-6. The corrugations 79 can be added to the flexor 54 at no extra cost to produce a blade that readily conforms to surfaces to be wiped.

Having thus described my invention, it is obvious that various modifications may be made in the same without departing from the spirit of the invention, and, therefore, I do not wish to be understood as limiting myself to the exact form, construction, arrangement and combination of parts herein shown and described.

I claim:

1. A flexible backing member for a windshield wiper blade adapted to wipe curved windshields, said member having at least two adjacent longitudinal portions with a plurality of undulations extending above and below the plane of said backing member along axes lying substantially perpendicular to the longitudinal axis of one of said portions for reducing resistance to flexing in one of said portions.

2. In a wiper blade for curved windshields, a resilient rubberlike elongate wiping element, a resiliently and reversely flexible elongate pressure-transmitting backing strip associated coactively therewith, said backing strip having a plurality of readily flexible adjacent and integral portions substantially equal in width, at least one of said portions having corrugations thereon, said corrugations comprising a plurality of undulations extending above and below the back of said backing member along axes substantially perpendicular to the longitudinal axis of said portion for substantially reducing the resistance of that portion to flexing relative to an adjoining portion of the backing strip whereby to produce in the blade a greater inherent ability to conform to a surface.

3. A flexible backing member for a windshield wiper blade adapted to wipe curved windshields, said backing member being relatively flexible in a plane substantially normal to the windshield and relatively inflexible in a plane transverse thereto, said backing member having at least two longitudinal portions, one of said portions having a greater effective length than its over-all length and being thinner constant throughout its length in the vertical dimension than at least one of said other portions whereby to produce a greater degree of flexibility in said one portion than in the other.

4. A flexible backing member for supporting the wiping element of a windshield wiper blade for curved windshields, said backing member being relatively flexible in a plane substantially normal to the windshield and relatively inflexible in a plane transverse thereto, said backing member being manufactured from a material of a thickness required to provide the minimum of flexibility desirable for at least one longitudinal portion of said backing member, another longitudinal portion of said backing member being given additional effective length and less thickness by reversely corrugating said portion whereby to provide less resistance to flexure in said last-named portion than in said first-named portion.

5. In a wiper blade for curved windshields, a resilient rubberlike elongate wiping element, a resiliently and reversely flexible elongate pressure-transmitting backing strip associated coactively therewith, said backing strip being relatively flexible in a plane substantially normal to the windshield and relatively inflexible in a plane transverse thereto, said backing strip being fabricated from material of substantially uniform thickness and having a plurality of readily flexible portions substantially equal in width, at least one of said portions having transverse sinusoidal corrugations whereby to produce a greater degree of flexibility therein.

6. In a wiper blade for curved windshields, a resilient rubberlike elongate wiping element, a resiliently flexible elongate pressure-transmitting backing strip associated coactively therewith, said backing strip being relatively flexible in a plane substantially normal to the windshield and relatively inflexible in a plane transverse thereto, said backing strip having a plurality of adjacent readily flexible portions substantially equal in width, at least one of said portions having transverse continuous sinusoidal shaped corrugations whereby to produce a greater degree of flexibility therein.

7. In a wiper blade for curved windshields, a resilient rubberlike elongate wiping element, a resiliently and reversely flexible pressure-transmitting backing strip associated coactively therewith, said backing strip being relatively flexible in a plane substantially normal to the windshield and relatively inflexible in a plane transverse thereto, said backing strip having a plurality of longitudinal portions, at least one of said portions having corrugations transversely disposed relative to the longitudinal axis of said blade whereby to produce in said last-named portion a different inherent resistance to flexure, said corrugations defined by adjacent continuous curved sections.

8. In a wiper blade for curved windshields, a resilient rubberlike elongate wiping element, a resiliently flexible backing strip associated coactively therewith, said backing strip being flexible in a plane substantially normal to the windshield and being inflexible in a plane transverse thereto, said backing strip having a plurality of longitudinal portions, a plurality of transverse corrugations formed in at least one of said portions whereby to reduce the resistance to flexing in said last-named portion, said corrugations being defined by continuous adjacent deformations out of the plane of the backing strip.

9. Flexible backing means for a windshield wiper element which is adapted to wipe a windshield having an irregular surface, said flexible backing means being elongate and adapted to be disposed generally coextensive with the wiper element, said flexible backing means having at least one longitudinal portion provided with a plurality of transversely disposed undulations extending above and below the plane of said longitudinal portion for reducing resistance to flexure in said longitudinal portion.

10. In a windshield wiper blade the combination of a resilient elongate wiping element having a wiping portion and a back portion spaced from said wiping portion, a flexible elongate backing member engaging with said back portion of said wiping element for coaction therewith, said backing member being flexible in a plane substantially normal to the windshield and relatively inflexible in a plane transverse thereto, said backing member having at least one longitudinal portion corrugated transversely thereto, whereby to cause a difference in the inherent resistance to flexure of said longitudinal portion of the flexible member to accommodate differing degrees of curvature of different areas of the surface of a windshield to be wiped, and pressure-distributing structure applying pressure to said backing member at longitudinally spaced-apart portions thereof to distribute pressure of a windshield wiper arm to the blade, said corrugations being of continuous sinusoidal shape.

11. In a wiper assembly comprising a pressure-distributing device operatively connected with a wiping blade comprising resilient elongate flexor means having end portions and an intermediate portion adapted to cooperate with said blade, said flexor means being relatively flexible in a plane substantially normal to the windshield and being relatively inflexible in a plane transverse thereto, transverse sinusoidal corrugations formed in at least one end portion thereof, said end portions of the flexor means being operatively connected at spaced points to said pressure-distributing device to receive pressure therefrom.

12. A windshield wiper assembly comprising a pressure-transmitting member operatively connected with a wiper blade, said wiper blade having a resilient elongate wiping element with a wiping portion and a back portion, flexible elongate backing means for said wiping element for coaction therewith, said backing means being relatively flexible in a plane substantially normal to a windshield to be wiped and being relatively inflexible in a plane transverse thereto, transverse corrugations formed in at least one end portion of said backing means, said transverse corrugations comprising a plurality of adjacent curved means formed out of the plane of said backing member along axes lying substantially perpendicular to the longitudinal axis of said backing means whereby said one end portion of the backing means is more freely flexible than the rest of the backing means in said plane substantially normal to the windshield.

13. A windshield wiper assembly comprising a pressure-transmitting member operatively connected with a wiper blade, said wiper blade having a resilient elongate wiping element with a wiping portion and a back portion, flexible elongate backing means for said wiping element for coaction therewith, said backing means being relatively flexible in a plane substantially normal to a windshield to be wiped and being relatively inflexible in a plane transverse thereto, transverse corrugations formed in at least one end portion of said backing means, said corrugations comprising a plurality of undulations extending above and below the plane of said backing member, said corrugations each having an axis lying substantially perpendicular to the longitudinal axis of said backing means whereby said one end portion of the backing means is more freely flexible than the rest of the backing means in said plane substantially normal to the windshield.

References Cited in the file of this patent

UNITED STATES PATENTS

| | | |
|---|---|---|
| 2,589,339 | Carson | Mar. 18, 1952 |
| 2,608,265 | Eckardt | Aug. 26, 1952 |
| 2,664,583 | Oishei | Jan. 5, 1954 |
| 2,772,436 | Deibel | Dec. 4, 1956 |
| 2,782,445 | Krohm | Feb. 26, 1957 |
| 2,814,821 | Wallis | Dec. 3, 1957 |
| 2,871,498 | Oishei et al. | Feb. 3, 1959 |

FOREIGN PATENTS

| | | |
|---|---|---|
| 744,398 | Great Britain | Feb. 8, 1956 |
| 785,865 | Great Britain | Nov. 6, 1957 |

OTHER REFERENCES

Germany, F17,814 11/63C, Dec. 20, 1956.